(12) United States Patent
Xiang et al.

(10) Patent No.: US 8,018,345 B2
(45) Date of Patent: Sep. 13, 2011

(54) RFID TAGS HAVING FERROMAGNETIC PATCHES

(75) Inventors: Xiao-Dong Xiang, Danville, CA (US);
Zhi-Gang Yu, San Jose, CA (US);
Huan-Hua Wang, Beijing (CN)

(73) Assignee: SRI International, Menlo Park, CA (US)

(*) Notice: Subject to any disclaimer, the term of this patent is extended or adjusted under 35 U.S.C. 154(b) by 296 days.

(21) Appl. No.: 12/066,070

(22) PCT Filed: Sep. 7, 2006

(86) PCT No.: PCT/US2006/034999
§ 371 (c)(1),
(2), (4) Date: Sep. 29, 2008

(87) PCT Pub. No.: WO2007/030699
PCT Pub. Date: Mar. 15, 2007

(65) Prior Publication Data
US 2009/0015376 A1    Jan. 15, 2009

(51) Int. Cl.
*G08B 13/14* (2006.01)

(52) U.S. Cl. ............... 340/572.6; 235/449; 235/450
(58) Field of Classification Search ............ 340/572.6; 235/449, 450, 435, 493, 375; 283/72, 82, 283/85
See application file for complete search history.

(56) References Cited

U.S. PATENT DOCUMENTS

| | | | | |
|---|---|---|---|---|
| 4,827,218 A | * | 5/1989 | Meunier et al. | 235/450 |
| 5,241,163 A | * | 8/1993 | Vachtsevanos et al. | 235/449 |
| 5,557,090 A | * | 9/1996 | Ganne et al. | 235/449 |

* cited by examiner

*Primary Examiner* — John A Tweel, Jr.
(74) *Attorney, Agent, or Firm* — Weaver Austin Villeneuve & Sampson LLP

(57) ABSTRACT

RFID tags and devices disclosed herein use ferromagnetic films to store information. The tags include patches of ferromagnetic materials, each patch having a particular ferromagnetic resonance frequency determined by the composition of the ferromagnetic film. When stimulated, the patches emit microwave or RF signals at their resonance frequencies and at intensities proportional to the patch sizes. The signals are read and the frequency spectrum of the tag may be determined by using a FFT. Identity and other information may be provided by the spectrum.

25 Claims, 12 Drawing Sheets

| Material, 4Ms (G) and Size (mm$^3$) | $f_{cal}$ (GHz) | $f_{meas}$ (GHz) |
|---|---|---|
| $Y_5Fe_{4.05}Ga_{0.95}O_{12}$  3.2 x 0.90 x .45 | 2.4356 | 2.6 |
| $Y_5Fe_{4.05}Ga_{0.95}O_{12}$  2.0 x 0.9 x 0.45 | " | 2.498 |
| $Y_5Fe_{4.05}Ga_{0.95}O_{12}$  1.0 x 0.9 x 0.45 | " | 2.15 |
| YIG-1780  1.0 x 0.9 x 0.33 | 3.6637 | 2.2625 |
| YIG-1780  2.0 x 2.0 x 0.33 (irregular shape) | " | 2.447 |
| YIG-1780  1.97 x 1.93 x 0.5 | " | 2.195 |
| YIG-1780  1.93 x 1.89 x 0.075 | " | 3.33 |
| YIG-1780  2 x 3 x 0.075 | " | 3.45 |
| YIG-1780  2 x 4 x 0.075 | " | 3.56 |
| Al:YIG-225  15 x 5 x 3 | 2.2015 | 1.48 |
| Al:YIG-225  5 x 3 x 2 | 2.2015 | 2.036 |
| Al:YIG-570  15 x 5 x 3 | 2.6286 | 1.60 |
| Al:YIG-570  5 x 3 x 2 | 2.6286 | 2.213 |
| Al:YIG-1010  15 x 5 x 3 | 3.0314 | 1.685 |
| Al:YIG-1440  15 x 5 x 3 | 3.3705 | 2.885 |
| YIG-1775  15 x 5 x 3 | 3.6637 | 2.780 |
| YIG-1775  5 x 3 x 2 | 3.6637 | 3.01 |
| Ca:YIG-530  15 x 5 x 3 | 2.5659 | 1.84 |
| Ca:YIG-530  5 x 3 x 2 | 2.5659 | 1.88 |
| Ca:YIG-830  15 x 5 x 3 | 2.8467 | 1.91 |
| Ca:YIG-1210  15 x 5 x 3 | 3.2054 | 2.96 |
| Ca:YIG-1650  15 x 5 x 3 | 3.5279 | 3.31 |

FIG. 10

RFID TAGS HAVING FERROMAGNETIC PATCHES

BACKGROUND

Radio frequency identification (RFID) systems use radio frequency electromagnetic waves to communicate between tags and an interrogator/reader. The tag may store or represent information about an object to which the tag is attached. Such information may include a unique identifying number, object status, location, and the like. Unlike bar codes and other systems that use optical technology, RFID tags do not have to be in the direct line of sight of the interrogator/reader but need only be located within its EM field. The tag may be attached to an individual item or to packaging containing multiple items. When the item or packaging is passed through the electromagnetic field of the reader/interrogator, signals from the attached tag are sent to the reader to identify or present information associated with the object. RFID systems may be passive or active; in passive systems, the RFID tags obtain operating power generated from the interrogator/reader while in active systems, the tags are powered by a battery located on the tag.

The cost of RFID tags is a major obstacle in expanding the use of RFID for object tracking. Conventional RFID systems store information in a simple integrated circuit on the tag. The systems require an antenna, generally copper, on the tag to send and receive signals. Antenna material and manufacturing costs are a large component of the overall cost of a tag. Antennas also present manufacturing and durability concerns. In addition, conventional RFID tags present security concerns as they are subject to reprogramming.

It would be desirable to have easier and cheaper methods of producing RFID tags. It also would be desirable to have RFID tags and systems that do not require tag antennas. Such tags would be more durable (i.e. with no points of attachment) and reduce manufacturing and design difficulties. It would further be desirable to have RFID tags that are not susceptible to reprogramming.

SUMMARY OF THE INVENTION

The present invention meets these needs by providing RFID tags and devices that use ferromagnetic films to store information. The tags of the present invention include patches of ferromagnetic materials, each patch having a particular ferromagnetic resonance frequency determined by the composition of the ferromagnetic film. When stimulated, the patches emit microwave or RF signals at their resonance frequencies and at intensities proportional to the patch sizes. The signals are read and the frequency spectrum of the tag may be determined by using a Fast Fourier Transform (FFT) algorithm. Identity and other information may be provided by the spectrum.

One aspect of the invention provides an RFID tag which may be characterized by the following features: (a) at least one permanent magnet; and (b) one or more ferromagnetic patches. In certain embodiments, each patch has a defined ferromagnetic resonance frequency and size such that when exposed to microwave or radio frequency stimulation; it emits a signal at the defined resonance frequency at an intensity proportional to the size. In certain embodiments, the at least one permanent magnet provides a substantially homogeneous magnetic field to a region of the RFID tag. In certain embodiments, the one or more ferromagnetic patches are provided in this region of substantially homogeneous magnetic field. Typically, the tag will include at least two patches and each patch has a unique resonance frequency and size. In some cases, the tag will have an information capacity of at least 96 bits.

Examples of ferromagnetic patch materials include yttrium iron garnet, bismuth iron garnet, bismuth iron oxide, and doped versions thereof. Examples of dopant materials for the ferromagnetic material include aluminum, calcium, gallium, and silicon.

The permanent magnet may have many different forms. In some cases, it is provided as one or more layers, each having a thickness between about 100 nm-100 μm. In certain embodiments, the permanent magnet is provided with a gap or as two separate magnets separated by said gap, such that the substantially homogeneous magnetic field is provided in the gap.

Another aspect of the invention pertains to RFID communication systems, which may be characterized by the following features: (a) a station having a receiver and a transmitter; and (b) an RFID tag configured to communicate with the station. The RFID tag may have features as described above. Typically, the RFID communication system will also include an antenna for receiving an interrogation signal and transmitting an RFID tag signal.

Yet another aspect of the invention pertains to methods of identifying an object. Such methods may be characterized by the following sequence of operations: (a) sending a broadband signal to an RFID tag attached to the object to excite ferromagnetic patches on the tag; (b) receiving resonance signals associated with the patches; and (c) determining a frequency spectrum of the tag. The method may further include sending one or more additional pulses of the broadband signal to the RFID tag after (a). The RFID tag may have features as described above.

These and other features and advantages of the present invention will be presented in more detail below with reference to the associated drawings.

BRIEF DESCRIPTION OF THE DRAWINGS

FIG. 10 is a table of absorption frequencies measured for various ferromagnetic materials useful for RFID devices of this invention.

DETAILED DESCRIPTION

Spin is an intrinsic angular momentum associated with microscopic particles that comes in multiples of ½ and can be + or −. Individual unpaired electrons, protons, and neutrons each possess a spin of ½. Particles with spin have a magnetic dipole moment; in a magnetic field, each spin can exist in one of a number of distinct states having different energies.

Unpaired spins are used in magnetic resonance. Ferromagnetic materials have some unpaired electrons so their atoms have a net magnetic moment and have strong magnetic moments due to alignment of large numbers of moments in parallel in magnetic domains. When a ferromagnetic material is in an unmagnetized state, the domains are randomly organized and the net magnetic moment is zero. However, when a magnetizing force is applied, the domains become aligned to produce a strong magnetic field with the individual spin magnetic moments coupled. Iron, nickel, and cobalt are examples of ferromagnetic materials.

Figure 1:
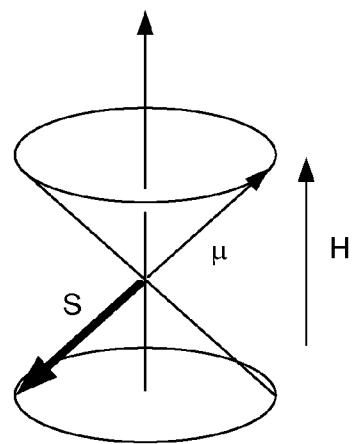
FIG. 1 is a schematic drawing showing the magnetic moment (μ) and spin angular momentum (S) vectors of a particle in the presence of an applied magnetic field (H).

FIG. 1 shows S, the spin angular moment vector of a particle and $\mu$, the magnetic dipole moment vector of a particle in the presence of an applied magnetic field H. Application of a magnetic field produces a torque on the magnetic dipole causing it to precess like a small gyroscope about the direction of the externally-applied field. The precession frequency is a function of the strength of applied field and the gyromagnetic constant. In the absence of any coupling between the electron spins and the surrounding atoms or particles, the precession would continue indefinitely. In reality, coupling causes the precession to be eventually damped.

Transitions can be induced between spin states by applying a steady magnetic field and then supplying electromagnetic energy, usually in the microwave or RF range of frequencies. Energy at right angles to the steady field will be absorbed when the frequency of the applied energy equals the precession frequency. For a ferromagnetic film with an in-plane applied magnetic field, $H_0$, the resonance frequency $\nu$ is $$\nu = 2\pi\gamma[H_0(H_0 + 4\pi M)]^{1/2}$$

$$M = m/V$$

where M is the magnetization, $\gamma$ the gyromagnetic constant, m is the magnetic moment and V is the volume of the film.

From a quantum mechanical point of view, the applied electromagnetic energy produces "spin flips" in which electrons are flipped into a higher energy spin state. After the applied energy is removed, the electrons tend to return to the lower energy state. As the electrons try to realign with the main magnetic field (returning to the lower energy states), they will emit energy at the frequency of the resonance frequency.

Thus an interrogation pulse sent from a reader/interrogator station to excite a ferromagnetic film with a resonance frequency $\nu_o$ will result in a resonance signal at $\nu_o$ that can be received, amplified and identified at the station. If the film has multiple resonance frequencies associated with it, the relative intensities of the resonance signals can be measured.

As long as the film is stimulated by an external RF source (or other interrogator), the system will resonate. Once the external energy is removed, the precession will spiral down or decay. Ferromagnetic materials have long spin lifetimes, i.e. the time it takes for the system to return to equilibrium after excitation of a ferromagnetic material is very long. (There are two spin relaxation time constants commonly referred to as T1, the spin lattice or longitudinal relaxation and T2, the spin or transverse relaxation. During T1, the spinning electrons realign with the external magnetic field. T2 is the measure of the time it takes for the spinning particles to lose phase coherence among particles spinning perpendicular to the main field. Both exhibit exponential decay.) Long spin relaxation lifetimes result in sharp resonance peaks.

The RFID tags and systems of the present invention rely on the resonance frequencies of ferromagnetic materials. An interrogator sends an interrogation pulse with a broad range of RFID signals to the tag. Resonance signals are received and identified at the reader. Generally, the RFID tags have multiple resonance frequencies, each frequency having an associated intensity. The reader receives the signals and the frequencies and intensities (or the relative intensities of the frequencies) are identified. Unique addresses are provided by the unique combinations of frequencies and intensities.

The long spin lifetimes of the ferromagnetic films are advantageous for RFID applications for several reasons. First, the sharp resonance peaks resulting from the long spin lifetimes means many frequencies can be contained within a given frequency range. As the information capacity of the device or system is related to the number of possible frequencies, the information capacity can be as large as desired. Second, the resonance signals last for an extended time period, even after the stimulation pulse is turned off. Since the response signal is received and amplified after the stimulation signal is turned off, cross link problems (entanglement between stimulation and response signals) are reduced or eliminated.

Figure 2A:
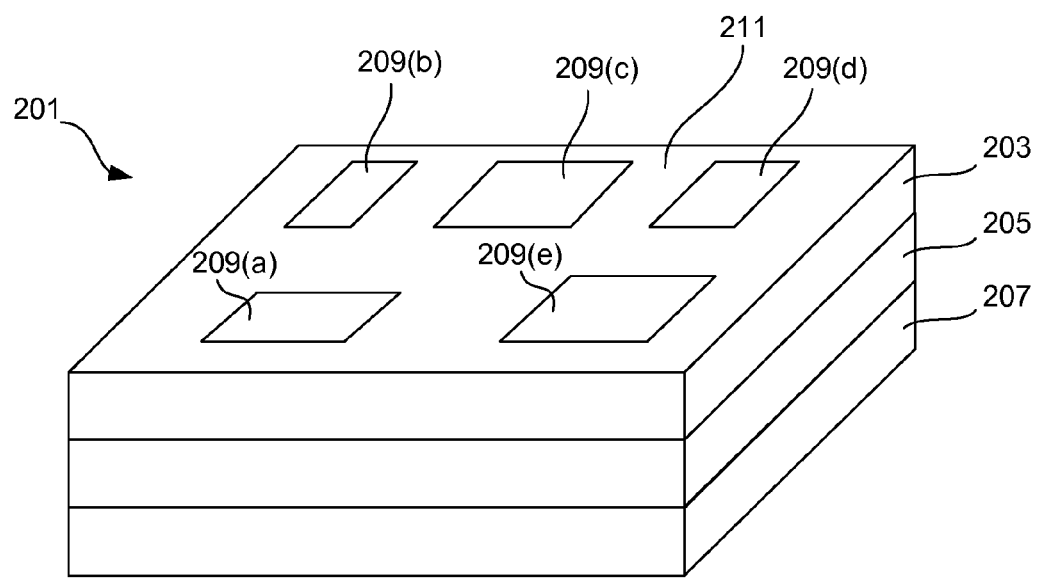
FIG. 2A is a schematic drawing showing certain layers of an RFID tag according to an embodiment of the present invention.

FIG. 2A shows a layered RFID tag 201 according to an embodiment of the present invention. Ferromagnetic layer 203 is above permanent magnet 205. As discussed above, a magnetic field must be applied to ferromagnetic materials to couple the electron spins. The magnetic field of permanent magnet layer 205 serves to couple the electrons of the ferromagnetic film in ferromagnetic layer 203. These layers rest on backing or substrate 207. The ferromagnetic layer contains ferromagnetic islands or patches 209(a)-(e) surrounded by non-magnetic material 211, typically a polymer.

The patches typically differ from each other in composition and/or size. In certain embodiments, each patch has a unique composition and a unique size. Each patch has a resonant frequency determined by the composition of the ferromagnetic material. The intensity of the response signal of each patch is a function of the area of the patch: the larger the area, the stronger the response signal. Thus, when excited by an interrogation pulse, a patch emits resonance signals at its unique frequency/intensity combination.

Figure 2B:
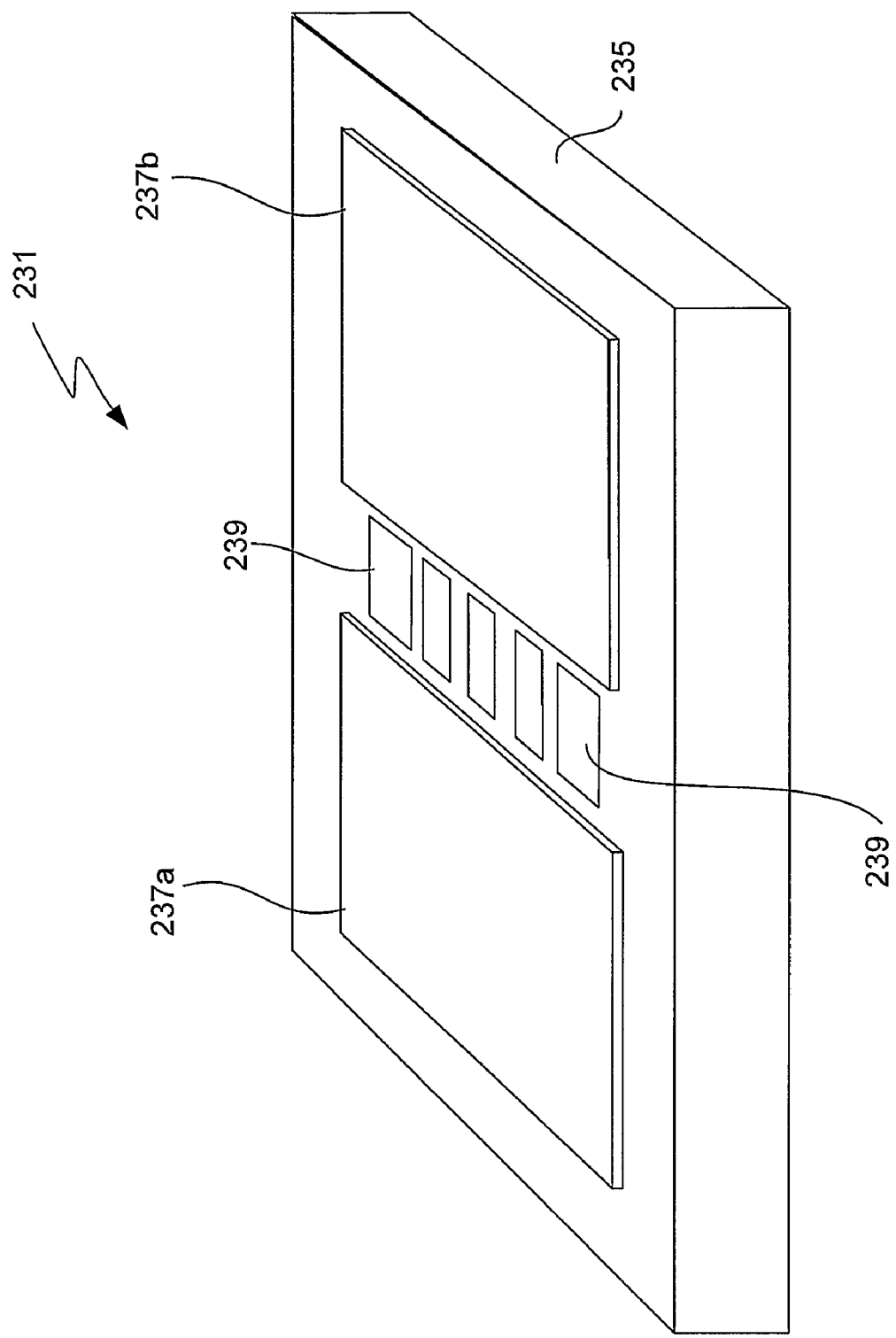
FIG. 2B is a schematic drawing showing the design of an RFID tag according to an embodiment of the present invention.

FIG. 2B shows another embodiment of an RFID tag in which the permanent magnet and the ferromagnetic material patches are provided on the same layer. In this embodiment, an RFID tag 231 includes a substrate or support 235 which supports two permanent magnets 237a and 237b and a group of five ferromagnetic patches 239. The permanent magnets 237a and 237b straddle the ferromagnetic patches. This provides a generally homogeneous magnetic field across the patches and thereby allows for a generally predictable response from the patches during interrogation. Note that while the permanent magnets are depicted in the same layer or level as the patches in this embodiment, other embodiments may provide magnets and patches at different levels, as would be the case when the magnets are located at levels above or below the patches. Other arrangements of permanent magnets are presented in FIG. 2C.

Figure 3A:
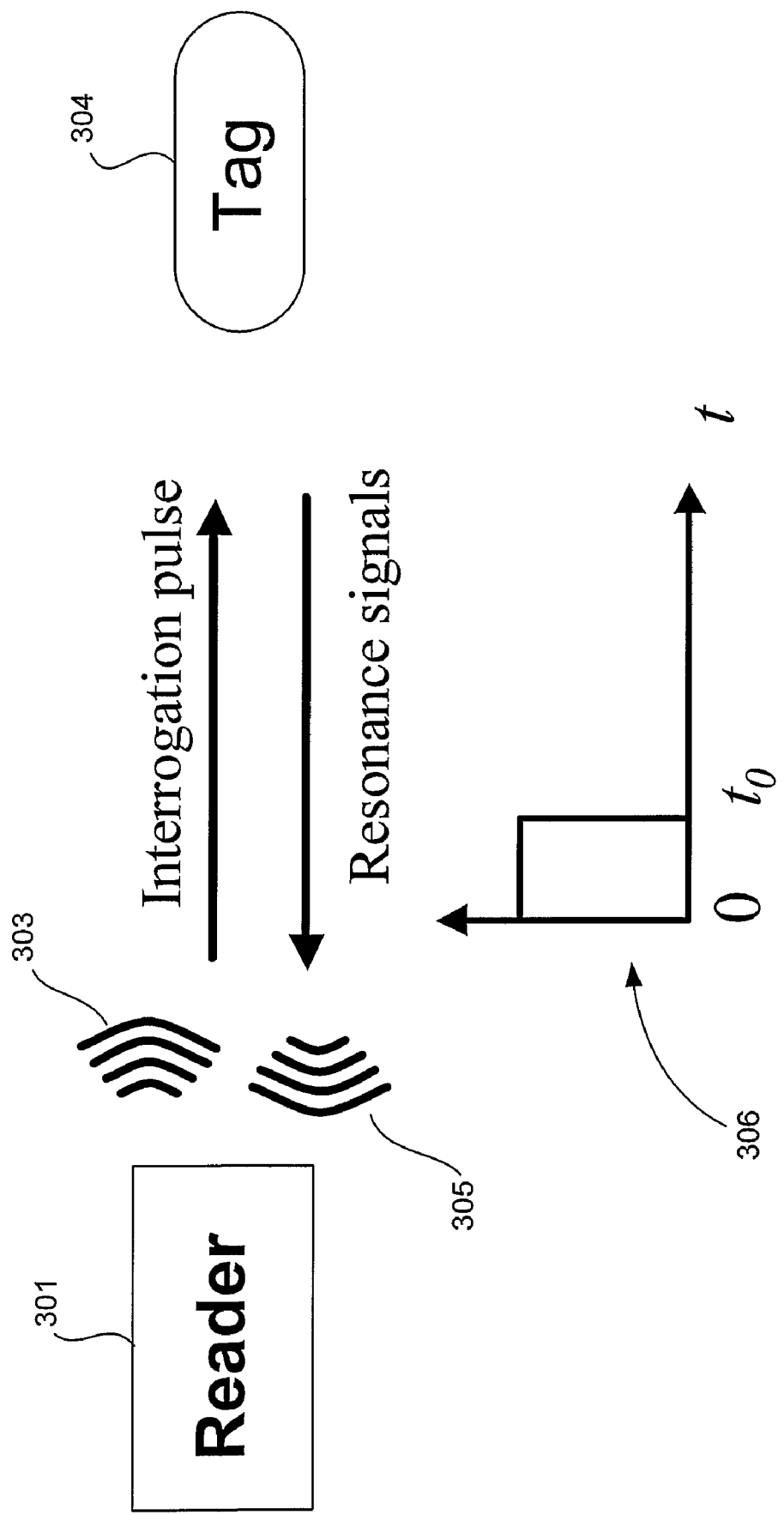
FIG. 3A is a representation of an interrogation pulse sent from a reader to a tag, and resonance signals sent from the tag to the reader as result of the excitation of ferromagnetic patches on the tag by the pulse. A graph illustrating the pulse over a time t=0 to a time t=$t_o$.

FIG. 3A illustrates the interrogation sequence of a tag according to certain embodiments. FIG. 3A shows an interrogator/reader 301 sending a broadband interrogation signal 303 to tag 304. The pulse excites the ferromagnetic patches, each of which emits a resonance signal at its resonance frequency and at an intensity proportional to patch area. Resonance signals 305 are sent back to the reader for detection. A graph 306 represents the interrogation pulse sent from the interrogator to the tag at time t=0. The interrogator pulse is turned off at time $t=t_0$. The resonance signals continue to be transmitted (due to the long spin lifetimes of ferromagnetic materials) after $t=t_0$. The reader may measure the resonance signals after the interrogation pulse is turned off to avoid detection problems due to entanglement with the interrogation pulse.

Figure 3B:
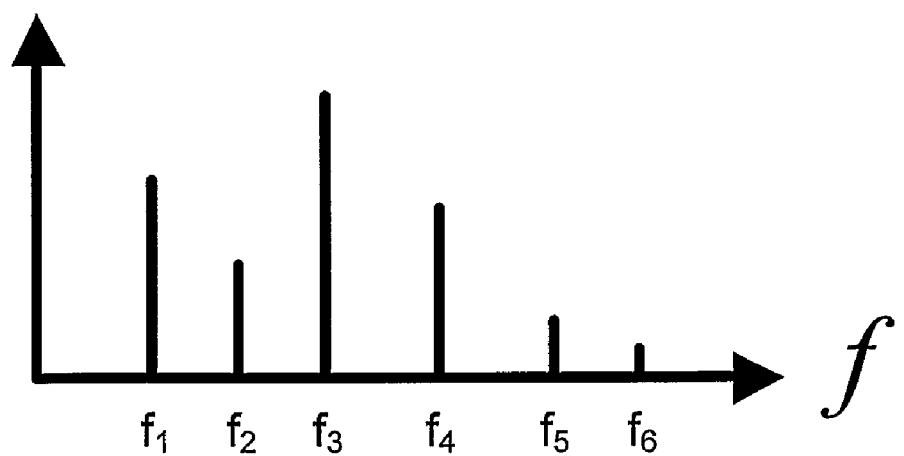
FIG. 3B is a representation of a graph illustrating the frequency spectrum of an RFID tag as determined by FFT.

FIG. 3B is a simplified example of a frequency spectrum of the RFID tag as determined by a Fourier transform, e.g., an FFT, at the reader. Frequencies $f_1$, $f_2$, $f_3$, $f_4$, $f_5$ and $f_6$ each correspond to a ferromagnetic patch on the tag, with intensity proportional to the area of the patch. Only the relative intensities of the patches need to be detected to determine the identity and/or other information stored on the tag.

Information Capacity

The information capacity of the RFID tags of the present invention, determined by the number of resonance frequencies, N, and the number of discrete intensities, k, is virtually unlimited. The number of distinct values, D, capable of being stored in approximately equal to $k^N-(k-2)2^N$. For N=128 and k=2, the number of distinct values that may be stored is over $10^{38}$ (over 128 bits), and for N=128 and k=5, the number of distinct values that may be stored is over $10^{89}$ (over 297 bits). Increasing the information capacity requires only increasing the number of resonant frequencies and/or discrete intensities.

The resonance frequency is a function of the composition of the patch. The resonance frequency is also a function of the applied magnetic field; however for tags such as the one depicted in FIG. 2, the applied magnetic field is supplied by a permanent magnet next to the ferromagnetic patches and is designed to be relatively constant or homogeneous. Further the resonance frequency is a function of the patch volume for patches that are not sufficiently thin in comparison to their length and width. For many designs, the magnetic field is sufficiently homogeneous and the patches are sufficiently thin, that the resonance frequencies can be assumed to be dependent only on the materials comprising the patches.

As discussed below, ferromagnetic materials may be doped to achieve a desirable resonance frequency. The total possible number of resonance frequencies N is $\Delta f/\Delta v$ where $\Delta f$ is the bandwidth as determined by the frequency range of the ferromagnetic films and the width of the resonance peaks $\Delta v$. For example, for a frequency range of 560 MHz-1.12 GHz, the bandwidth is 512 MHz. As discussed further below, ferromagnetic resonance signals may be on the order of 2.8 MHz. The number of resonance frequencies N is thus 512 MHz/2.8 MHz, or greater than 180.

As the resonance intensity is proportional to the volume of the ferromagnetic patch, the number of discrete intensities may be increased by increasing the number of different sized patch volumes (or areas, as the thickness of the films may be designed to be relatively uniform).

Process

As discussed above with regard to FIG. 3A, a broadband pulse is sent to excite the ferromagnetic patches and cause electron spins to transition to higher spin states. Signals are then received at the reader and the frequency spectrum is determined by a Fourier transform, e.g., an FFT algorithm.

The interrogator sends a broadband signal to excite the system and generate strong resonance signals. The signal must span all possible resonance sequences of the tag to capture each the resonance frequencies of the ferromagnetic patches of the tag. The broadband signal is typically sent for a time ranging from 1 µs-1 s. The resonance signals are then measured in the time domain by the reader after the excitation signal is turned off. The frequency spectrum is obtained by performing an FFT.

In some embodiments, signal detection is enhanced by sending multiple read pulses after an initial excitation pulse. Read pulses are also broadband signals, the purpose of which is to slow the decay of the precessing electron spins. In certain embodiments, the read pulses are less powerful than the initial excitation signal; for example sent at half the intensity of the initial excitation signal. The read pulses are also sent for a shorter time period, for example 10 ns. After each read pulse is turned off, the resonance signal is measured in the time domain. FFT is used to obtain the frequency spectrum of each signal. The multiple spectra are averaged to reduce influence of random fluctuations and obtain the tag identification. In preferred embodiments, only the relative intensities at each of the frequencies are determined to obtain the tag identification.

Figure 3C:
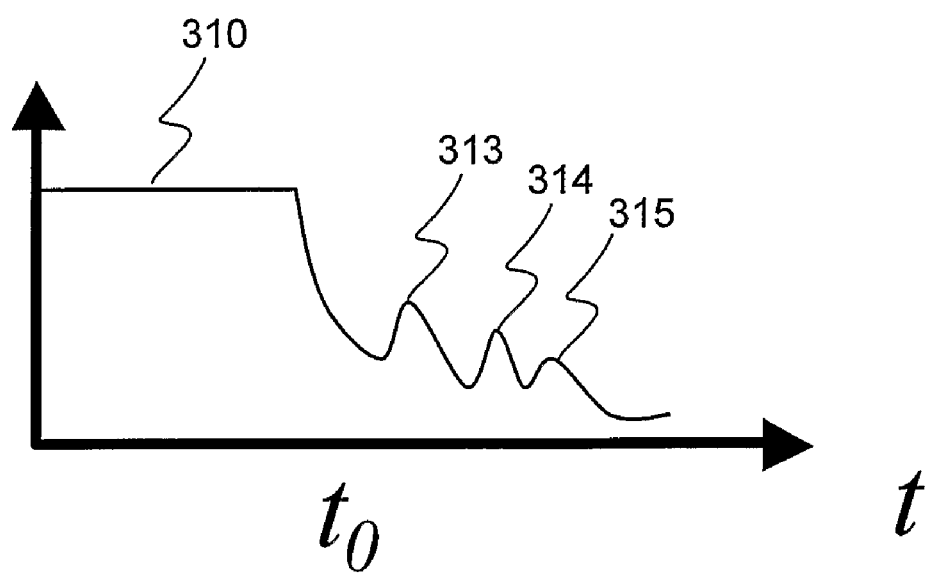
FIG. 3C is a representation of a graph showing decay of electron spins precession when excited by multiple interrogation pulses.

FIG. 3C illustrates the time varying decay of the precessing electrons in embodiments where multiple pulses are sent. At 310, the system is excited by the initial excitation. The precessions then start to decay, but are excited again at 313, 314 and 315 by the read pulses. As described above, the resonance signal may be measured after each read pulse ends.

Tag Components

Referring back to FIGS. 2A and 2B, the RFID tags of the present invention may generally employ two, three, or more layers. The permanent magnet and ferromagnetic layers are supported by a substrate, directly or indirectly. The substrate may be made of any suitable material that is able to support the magnetic layers. The material should be non-magnetic and non-conductive so as not to interfere with the operation of the tag, as well as being flat and generally stiff. Examples of such materials include polymers, glass and ceramics. Silicon and other semiconductor materials may be used as well.

The permanent magnet film serves to align the electronic spins of the ferromagnetic film. The permanent magnet layer is a thin film and may be composed of any permanent magnet material, including rare earth (e.g., neodymium) magnets, samarium-cobalt magnets, plastic magnets and alnico magnets. In preferred embodiments, the permanent magnet is a relatively inexpensive material.

Because each ferromagnetic patch or island should be exposed to the same magnetic field, H, H should be homogenous in direction and magnitude across its surface. The permanent magnet film must be thick enough to provide a magnetic field strong enough to couple the electron spins of the ferromagnetic material. According to various embodiments, the thickness for the permanent magnet layer is about 100 nm to 100 µm. In certain embodiments a single film covers the entire substrate; in alternate embodiments, there are individual permanent magnet films for each ferromagnetic patch. In certain embodiments, two or more permanent magnets are provided in a single layer in an arrangement in which they straddle the ferromagnetic patches.

The permanent magnetic film may have various morphologies. For example, it may be made from a particulate material provided in a binder or it may be made from a slice of polycrystalline material. Regardless, of the microscopic morphology and method of fabrication, it is generally desirable that the film surface be macroscopically smooth.

Figure 2C:
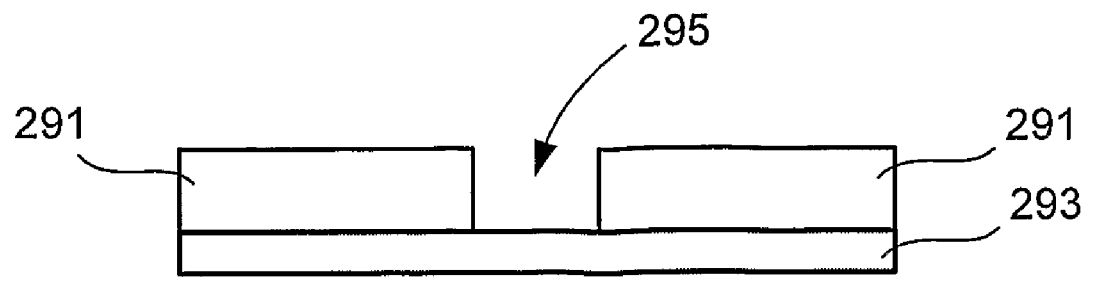
FIG. 2C is a cross-sectional depiction of various arrangements of permanent magnets for use in RFID tags of the present invention.
Figure 2C:
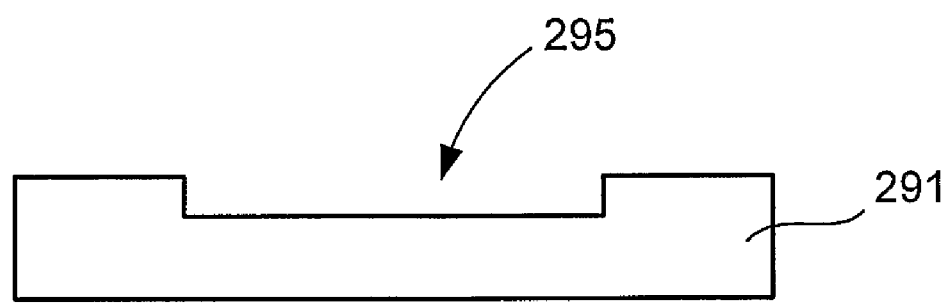
Figure 2C:
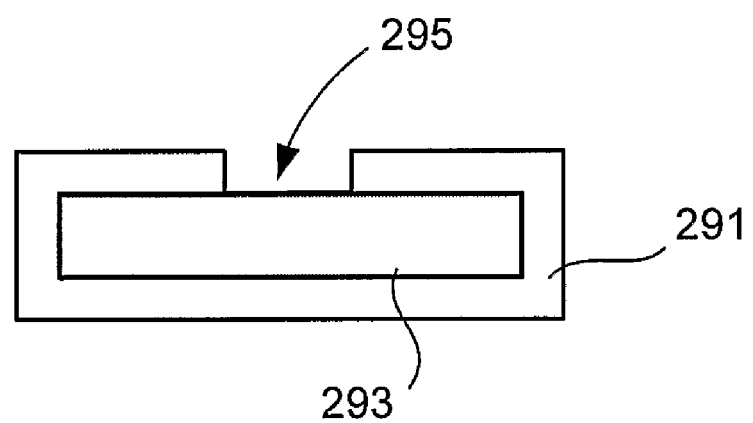

As explained, certain arrangements of the permanent magnet and the ferromagnetic patches apply a substantially homogeneous magnetic field across all patches. This may be accomplished by, for example, providing relatively large permanent magnets (with respect to the size of the patches) straddling the patches. This arrangement is shown in FIG. 2B, where two permanent magnets are disposed on opposite sides of a line of patches. The same relative arrangement could be provided in a three layer structure as shown in FIG. 2A, where the permanent magnets reside in a layer beneath the ferromagnetic patches. In other embodiments, the permanent magnets could reside in a layer above the patches. In some cases two layers of permanent magnet could be provided, one above and the other below the ferromagnetic patches. FIG. 2C shows certain symmetric permanent magnet 291 and substrate 293 arrangements which provide a substantially uniform magnetic field in a gap 295 between the magnets or protrusions of the magnets. In typical cases, the ferromagnetic patches will be provided within the gap. Note that the topmost embodiment in FIG. 2C resembles the arrangement of FIG. 2B, where two separate permanent magnets are mounted on top of substrate 293 and provide a substantially homogeneous magnetic field in the region between the magnets. In the embodiment depicted in the second arrangement of FIG. 2C, no substrate is provided and ferromagnetic patches are mounted directly to a single permanent magnet 291 in gap 295 formed on the magnet. The lowermost embodiment in FIG. 2C provides an arrangement in which the substrate 293 is substantially surrounded (in at least two dimensions) by a single permanent magnet 291.

The ferromagnetic layer includes ferromagnetic patches separated by a non-magnetic material such as a polymer. Each patch may also include a binder material to hold the ferromagnetic patch together. There is at least one patch per tag. The maximum number of patches is determined by the information capacity required, tag size and the minimum patch size required for signal detection at a particular distance from the interrogator.

In some embodiments, there is an additional layer including an antenna for receiving and/or emitting the microwave or RF signals. The antenna may be a metal spiral, e.g. a gold or copper antenna. However, in preferred embodiments the tag does not require an antenna (i.e., the signal strength is sufficient without the antenna). Antennas used in conventional RFID applications are well known and may be incorporated into the RFID tags of the present invention.

Ferromagnetic Films

Figure 4:
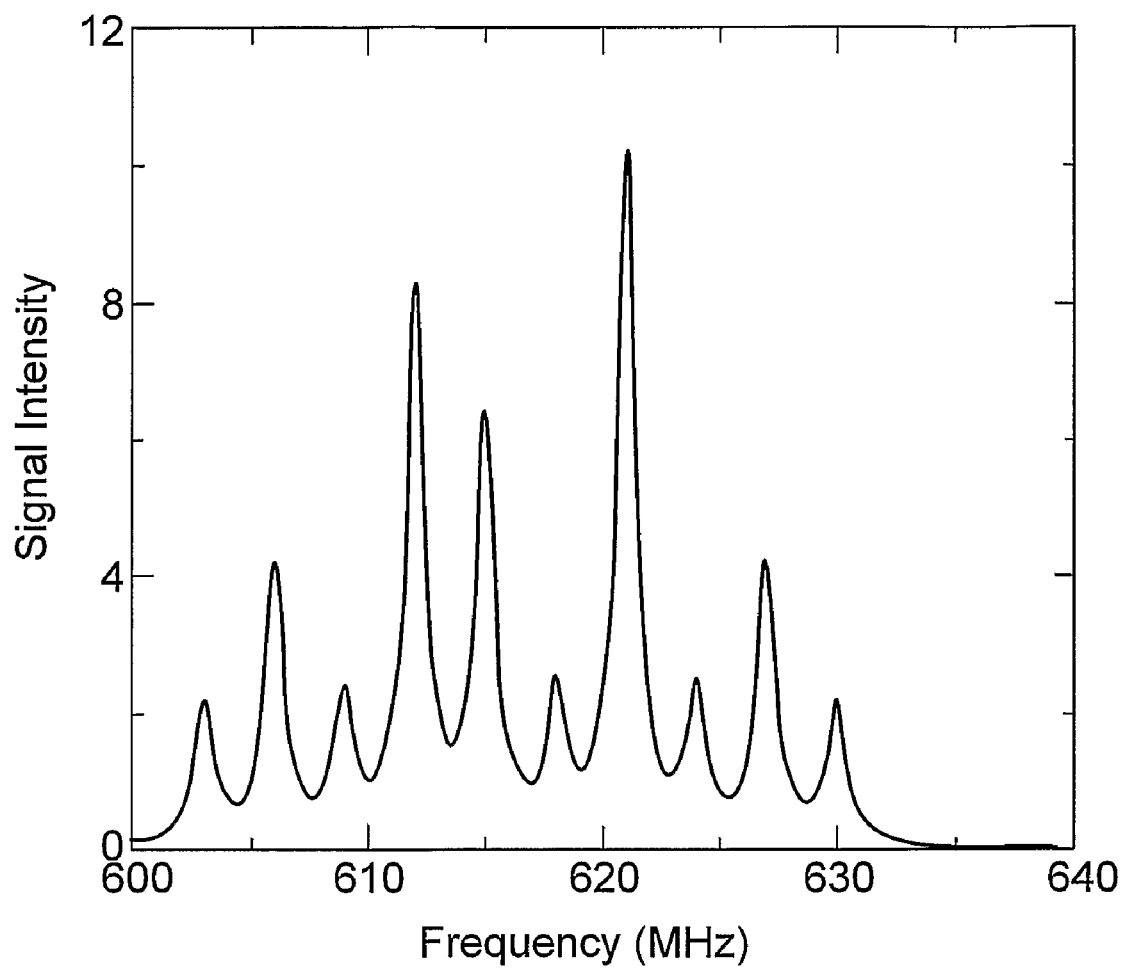
FIG. 4 shows an example of a frequency spectrum of YIG materials of various doping levels.

The ferromagnetic films may be any ferromagnetic material. In preferred embodiments, the ferromagnetic material has a long decay time with sharp resonance peaks. Ferromagnetic insulator materials, such as oxides and silicates, are preferred over ferromagnetic metals for this reason. In preferred embodiments, the ferromagnetic material is selected from one or more of yttrium iron garnet (YIG), bismuth iron garnet, and bismuth iron oxide. In a particularly preferred embodiment the ferromagnetic film is YIG. FIG. 4 shows an example of a frequency spectrum of a YIG material. As can be seen in the figure, the resonance peaks are sharp and narrow with a width of about 2.8 MHz. As discussed above, the sharp peaks allow for increased information capacity as more information can be packed into a system using a particular bandwidth.

In preferred embodiments, each patch or island has a distinct resonance frequency. As indicated, the resonance frequency of a patch is determined by the composition of the ferromagnetic film. Distinct resonance frequencies may be obtained by using different ferromagnetic materials, or in preferred embodiments, different doping concentrations. Preferably, the material is easily tunable to a desired resonance frequency by doping. Desired resonant frequencies may be obtained by using different types of dopants and/or different doping concentrations.

Figures 5A, 5B:
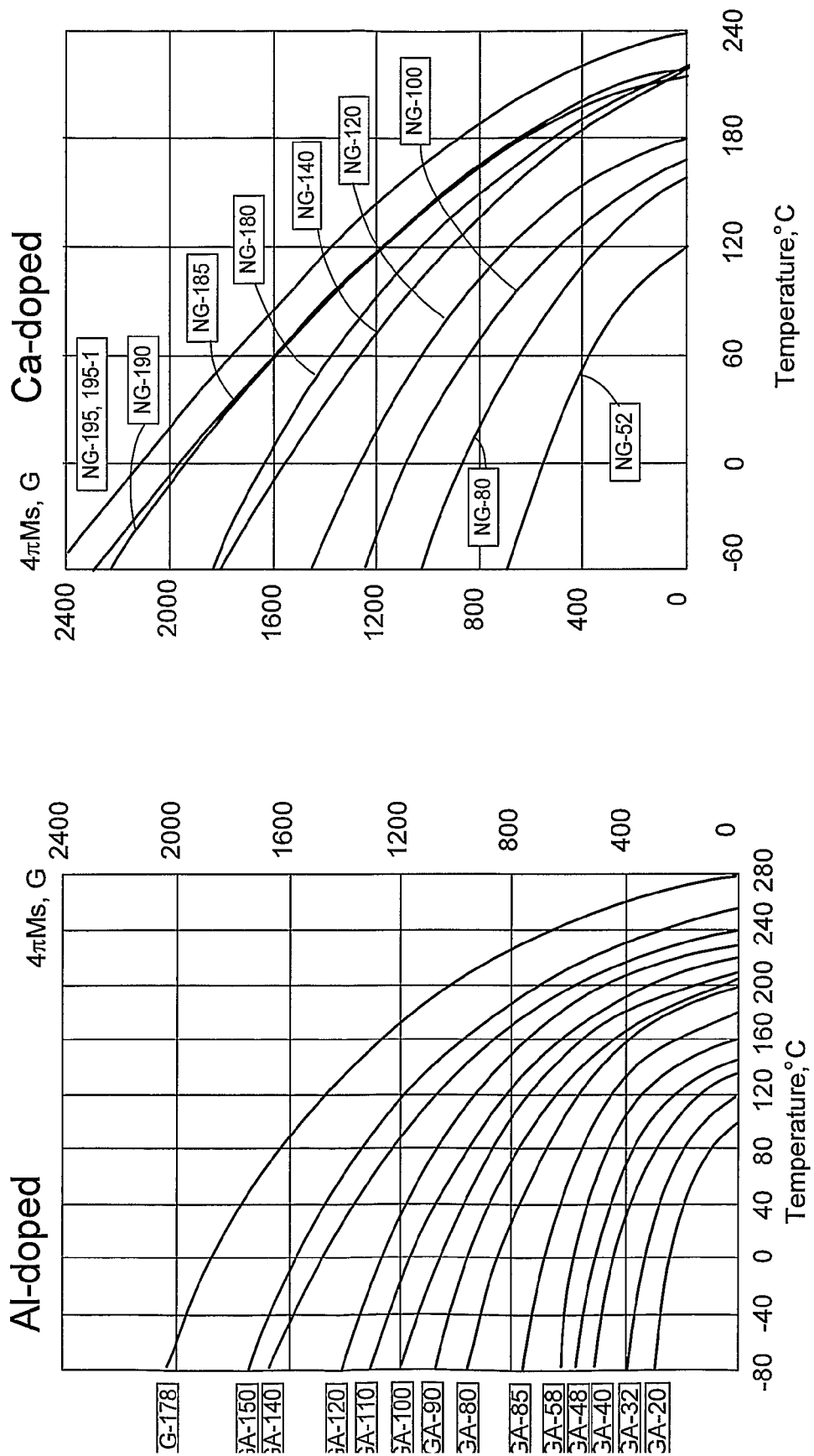
FIGS. 5A and 5B show saturation magnetization of Al-doped and Ca-doped YIG at various doping concentrations.

YIG or other ferromagnetic material can be doped be various elements including Al, Ca, Ga and Si. Other elements may also be used as dopants. Garnets are particularly appropriate for doping as the silicate structures accommodate a wide range of ion sizes. YIG is also preferred as the doping is easily calibrated, i.e. it is known what doping level to use to achieve a desired frequency. FIG. 5A shows the saturation magnetization, M, of Al-doped YIG films and FIG. 5B that of Ca-doped YIG films. Each curve corresponds to a different doping concentration. Similar saturation magnetization curves for various doping levels may be found for other dopants and ferromagnetic materials.

As discussed above, resonance frequency is a function of the magnetization, M as given by the following formula: $v=2\pi\gamma[H_0(H_0+4\pi M)]^{1/2}$. Thus, each distinct magnetization value corresponds to a distinct resonance frequency. At a particular temperature, a desired magnetization (and thus a desired resonance frequency) may be obtained by setting the appropriate dopant and doping concentration. In preferred embodiments, all of the patches on a tag are made of one material (e.g., YIG) with different dopants and/or dopant concentrations though a tag could contain multiple types of materials (e.g., YIG and bismuth iron garnet).

The resonance frequencies of YIG materials are in the microwave range, however with doping it is possible to achieve resonance frequencies in the RF range as well.

Patch And Tag Size

Intensity of the signal is determined by the volume of the ferromagnetic patch. For the resonance signal to be detected by the reader, it must be larger than the background or Johnson noise. The minimum patch volume is determined by the magnetic moment, m, required for detection at a distance R from the reader:

$$m = \frac{8(k_B T)^{1/2}(\Delta f)^{1/2}\sqrt{\pi}\,cR}{\sqrt{nr_0 d}\,(2\sigma)^{1/4}\mu_0^{1/4}(2\pi v_0)^{7/4}}$$

where $d$, $r_0$, $n$ and $\sigma$ are respectively the cross dimension, radius, number of turns and conductivity of the receiving coil. $\mu_0$ is the vacuum permeability and $v_0$ is the interrogation RF frequency. The volume, V, of a patch with a magnetic moment, m and a magnetization, M is given by V=m/M. Patch size may then be calculated accordingly. For example, for $r_0$ of 0.1 m, d of 0.01 m, n of 100, $\Delta f$ of 1 GHz and $v_0$ of 1 GHz, the size of a YIG island required for an interrogation distance R of 1 meter and a film thickness of 2 μm is 100 μm by 100 μm.

One of skill in the art will understand that these parameter values are examples and may be varied to achieve the patch size and interrogation distance desired. Required volume increases proportionally with R; an R of 4 m and the same parameters given above requires a patch of 200 μm by 200 μm (for a thickness of 2 μm). Patch size may be varied by varying the reader parameters as well.

As discussed above, the number of discrete patch sizes determines the information capacity of the RFID tags and systems of the present invention. In most cases, the thickness of the patches will be constant, so the number of discrete areas determines the information capacity.

Overall tag size depends on the number of patches as well as the patch size. There is also usually a minimum separation distance between the patches, e.g., on the order of 1 μm. For example, a tag only of only 1 cm$^2$ would easily fit hundreds of patches having an average patch size corresponding to the dimensions discussed above. Of course, the overall tag size could be increased to meet the needs of a particular application.

Interrogator/Reader

The RFID systems of the present invention include an interrogator and a reader. The interrogator must be able to send out a broadband signal to excite the ferromagnetic patches on the tag. The reader or detector system must be able to receive the signal and perform a Fourier transform (e.g., FFT) to generate the relative intensities of the frequencies in the tag. Typically a single device acts as both the interrogator and a reader, though they may be multiple devices.

The RFID interrogators used in the systems of the present invention are generally configured to send out broadband signals in the microwave and/or RF ranges (e.g., in the range of 1 GHz). The signal bandwidth should include all possible frequencies of the patches on the tag. In some embodiments, the interrogators are configured to send out read pulses after the initial excitation.

The RFID readers used in the systems of the present invention are configured to measure the resonant signals in the time domain. The reader also includes software to perform FFT and determine the relative intensities of the signals. If multiple pulses are used, the reader is configured to measure signals after each pulse is turned off. RF sources that send multiple pulses and receive multiple response signals are commonly used for NMR. In certain embodiments, conventional, even industry-standard, reader and/or interrogator designs are employed.

Figure 6:
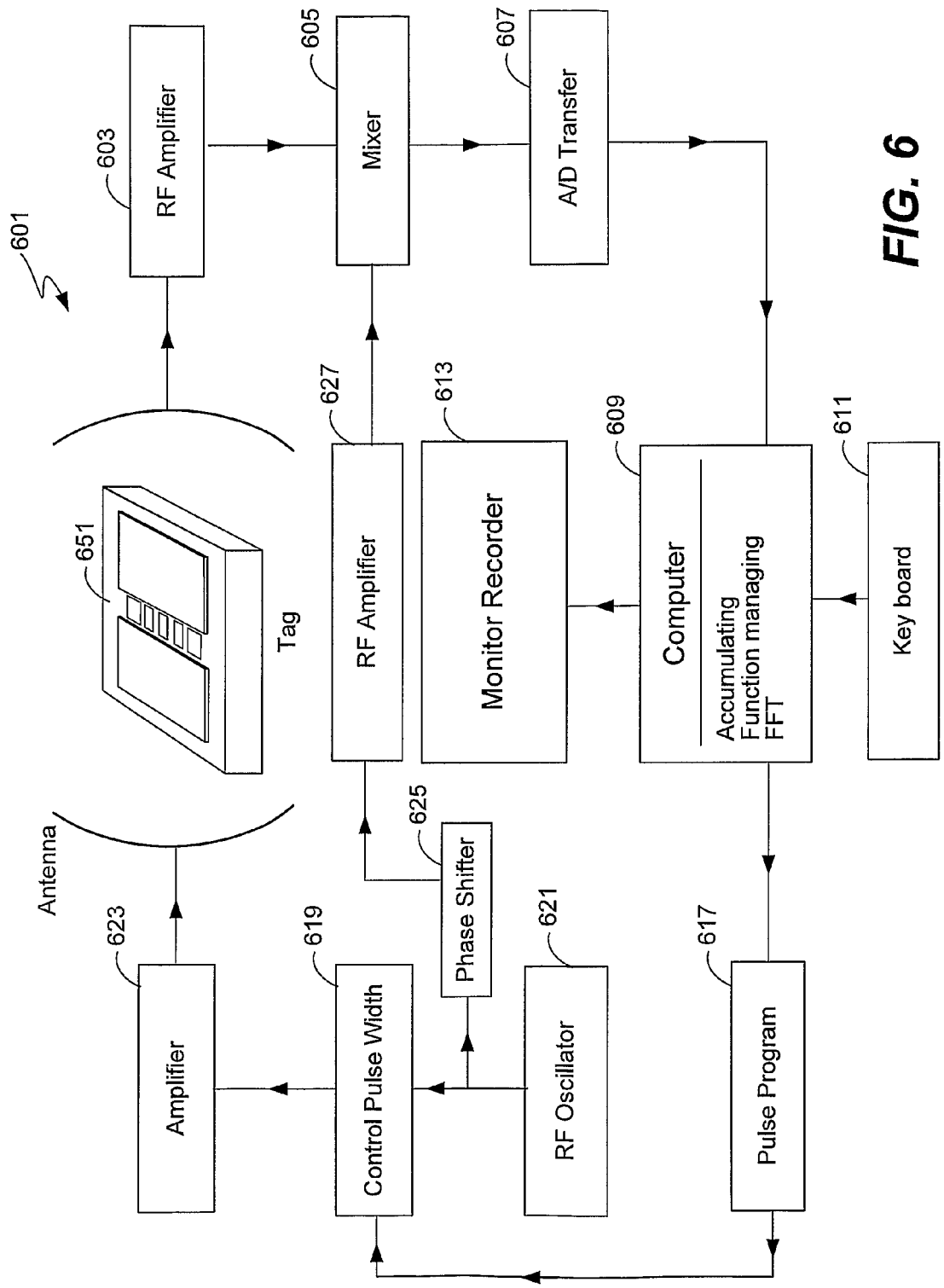
FIG. 6 is a block diagram of an RFID interrogator/reader system in accordance with certain embodiments.

FIG. 6 presents a block diagram of an interrogator/reader system 601 suitable for use in embodiments of the invention. The reader side includes an RF Amplifier 603, a mixer 605, an analog-digital converter 607, and various computational resources such as a computer 609, with various I/O components such as an associated keyboard 611 and monitor/storage/recording devices 613. RF signals generated by a sample tag 651 during or after interrogation are captured and then amplified by RF amplifier 603. The amplified signals are provided to mixer 605, which generates the net response from a tag by differencing the input and output signals. Input signals are provided to mixer 605 via a phase shifter 625 and an RF amplifier 627. The resulting time-domain signal is then provided to the A/D converter 607, which digitizes the signal for presentation to computer 609. The computer then deploys one or more software algorithms, notably a transform algorithm such as an FFT algorithm, to convert the time domain signal to frequency domain signals. A resulting intensity/magnitude versus frequency profile for tag 651 is stored or directly analyzed by an appropriate software routine to identify the numerical ID associated with the tag. Further classification and/or action software appropriate for the end application may act on the ID information to make decisions regarding routing, handling, security, etc.

On the interrogator side, the computer may provide information about interrogation pulses (e.g., frequency range (bandwidth), intensity, pulse duration, pulse sequence (e.g., large initial pulse followed by smaller, shorter pulses), etc.). Such information may be provided to a pulse program device 617, which converts the pulse profile to format for controlling generation of the physical interrogation signals. In certain embodiments, the pulse program itself provides the pulse profile information (i.e., computer 609 need not be directly involved with pulse generation). Regardless of the origin of the pulse sequence, the relevant control information is provided to an emitting gate 619, which controls generation of the actual RF pulsed interrogation signal as powered by an RF oscillator 621. The resulting RF interrogation signal is amplified by an amplifier 623 and directed onto tag 651 to perform the interrogation.

Manufacturing

The tags of the present invention may be fabricated by any known methods. Affixing the permanent magnet layer to the substrate may be accomplished by any known method. High temperature deposition (e.g., CVD or PVD) processes may be used on substrates that are able to withstand high temperatures, such as ceramics or semiconductor materials. For polymer substrates, the magnetic layer may be applied by a method such as spin coating. Typically the permanent magnetic material is applied in a continuous thin film; however if it is desired to put a patch of permanent magnetic material proximate the ferromagnetic patches, lithography or printing processes (e.g., ink jet printing processes) may be employed.

Applying the ferromagnetic patches to the permanent magnet layer requires a manufacturing process that allows different materials to be applied in the same plane in a controlled fashion. Ink jet printing and lithography are two methods that may be used. For example, an ink jet printer may be used to apply the ferromagnetic material, with each nozzle applying a patch of a different composition (material, dopant, and dopant concentration may be varied).

In embodiments including an antenna, the antenna may be attached or applied by conventional RFID tag fabrication techniques.

Applications

RFID tags are suited for use in many applications. The RFID tags of the present invention may be used as identity tags and/or contain information about the objects to which they are attached.

As discussed above, the frequency spectrum associated with each tag is determined by the size and composition of the ferromagnetic patches on the tag. Once the tag is manufactured, the frequency spectrum cannot be altered. Because the RFID tags of the present invention are not susceptible to tampering or reprogramming, they are particularly suitable for applications requiring high security.

Figure 7:
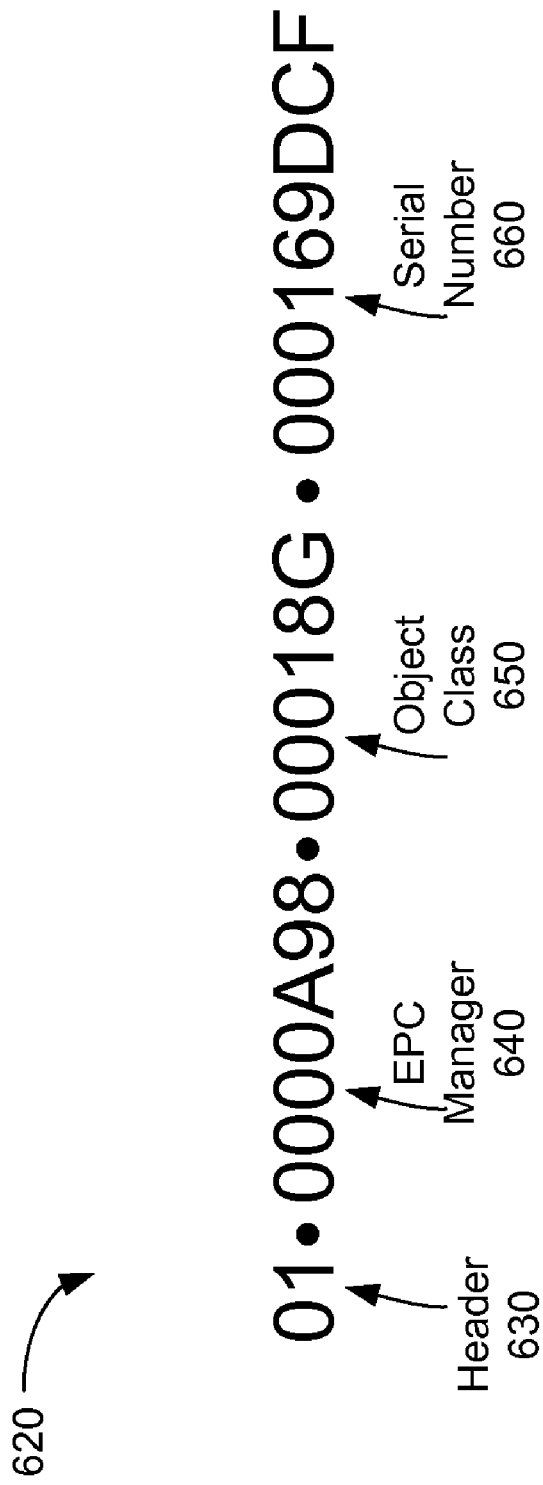
FIG. 7 shows an example of a 96-bit EPC code that may be used to store information on the tags of the present invention.

Small sized tags, e.g. about 1 cm$^2$, may be used as identification tags for billions of objects, for example using an EPC code. An EPC code includes variable length bits of information (common formats are 64, 96 and 128 bits), which allows for identification of individual products as well as associated information. As shown in FIG. 7, a 96-bit EPC 620 includes a 8-bit header 630, a 28-bit EPC Manager field 640, a 24-bit Object class field 650 and a 36-bit serial number field 660. EPC Manager field 440 contains manufacturer information. Object class field 650 includes a product's stock-keeping unit ("SKU") number. Serial number field 660 is a 36-bit field that can uniquely identify the specific instance of an individual product i.e., not just a make or model, but also down to a specific "serial number" of a make and model. A 96-bit EPC codes allows 268 million companies (EPC Manager field) to each categorize 26 million different products (Object class field), with each product category containing over 687 billion items (Serial number field).

Although the foregoing invention has been described in some detail for purposes of clarity of understanding, it will be apparent that certain changes and modifications may be practiced within the scope of the invention. It should be noted that there are many alternative ways of implementing both the process and compositions of the present invention. Accordingly, the present embodiments are to be considered as illustrative and not restrictive, and the invention is not to be limited to the details given herein.

EXAMPLES

Example 1

Figure 8:
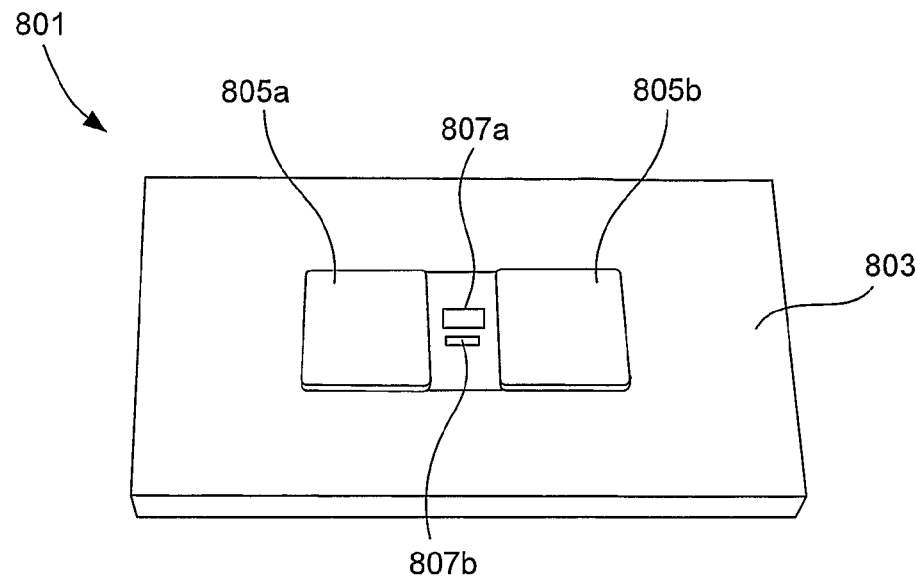
FIG. 8 shows the structure of a 2-bit RFID tag prototype.

FIG. 8 shows a prototype ferromagnetic RFID device. As depicted, the device 801 includes a polytetrafluoroethylene (Teflon®) substrate 803 on which were attached two permanent magnets 805a and 805b, and two ferromagnetic islands 807a and 807b. Permanent magnets 805a and 805b were positioned to straddle the islands in order to provide a homogeneous magnetic field in the region of the islands. The magnets were rectangular pieces of NdFeB coated by Ni—Cu—Ni alloy purchased from Amazing Magnet, Irvine, Calif. and cut to dimensions of ½"×½"×1/16". They were separated from one another by a distance of 6 mm and attached to substrate 803 by double-sided type. Island 807a was a 4 mm×2 mm×0.075 mm slice of undoped YIG, and island 807b was a 2 mm×1 mm×0.45mm slice of gallium-doped YIG. The YIG material for the islands was purchased from Ferrite Domen Co, Russia.

Figure 9:
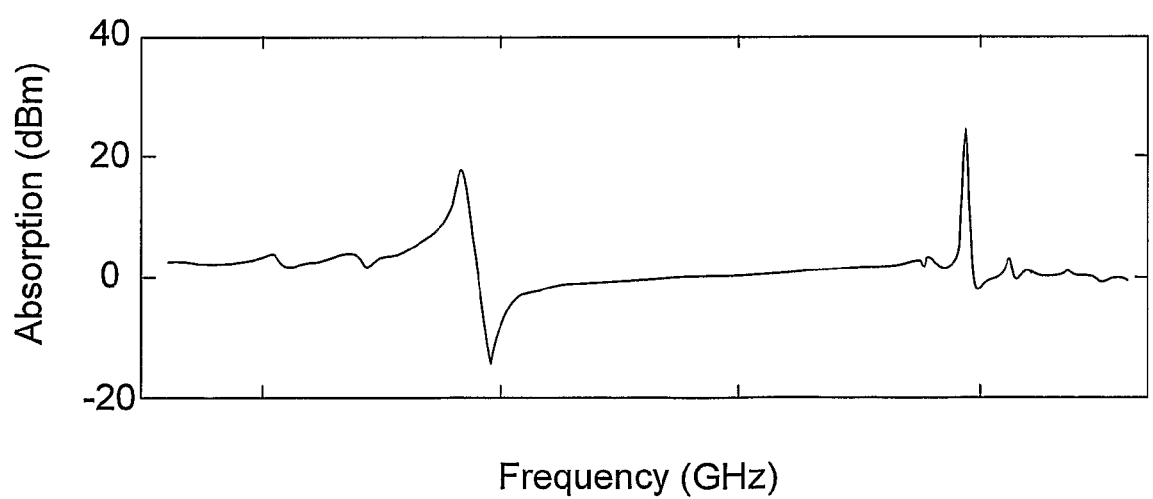
FIG. 9 shows an absorption spectrum of the prototype RFID device of FIG. 8.

Prototype device 801 was exposed to a scanning interrogation at frequencies of between approximately 1.7 GHz and 3.7 GHz provided at a power of 3.1 mW in two normal loops. The RF/microwave spectrum was generated by a network analyzer. An RF/microwave propagated along a waveguide to one of the two normal loops and excited the tags. The other loop received resonance signals emitted from the tag. FIG. 9 shows an absorption spectrum of the device in the test chamber. As can be seen, the device produced absorption peaks at approximately 2.4 GHz and 3.4 GHz, corresponding to the gallium doped YIG island 807b and the undoped YIG island 807a, respectively. Note that a magnetic field of 69.4 mTesla was applied to the islands by permanent magnets 805a and 805b.

Example 2

In this example, a series of ferromagnetic samples was prepared and tested for absorption. FIG. 10 presents a table of different ferromagnetic materials purchased from Ferrite Domen Co. Islands of these materials were cut from the purchased samples and then attached to a Teflon® substrate next to a permanent magnet. The field strength experienced by the samples was 69.4 mTesla. The vendor descriptions of the materials, as well as their dimensions in the test devices, the calculated absorption frequencies (independent of dimensions), and measured absorption frequencies are presented in the table of FIG. 10. The calculations of the resonance frequencies of the slabs and the films were performed using the demagnetization factor of an ideal thin film.

$$f = \gamma \sqrt{B_0 \cdot (B_0 + \mu_0 M)}/(2\pi)$$

Figure 11:
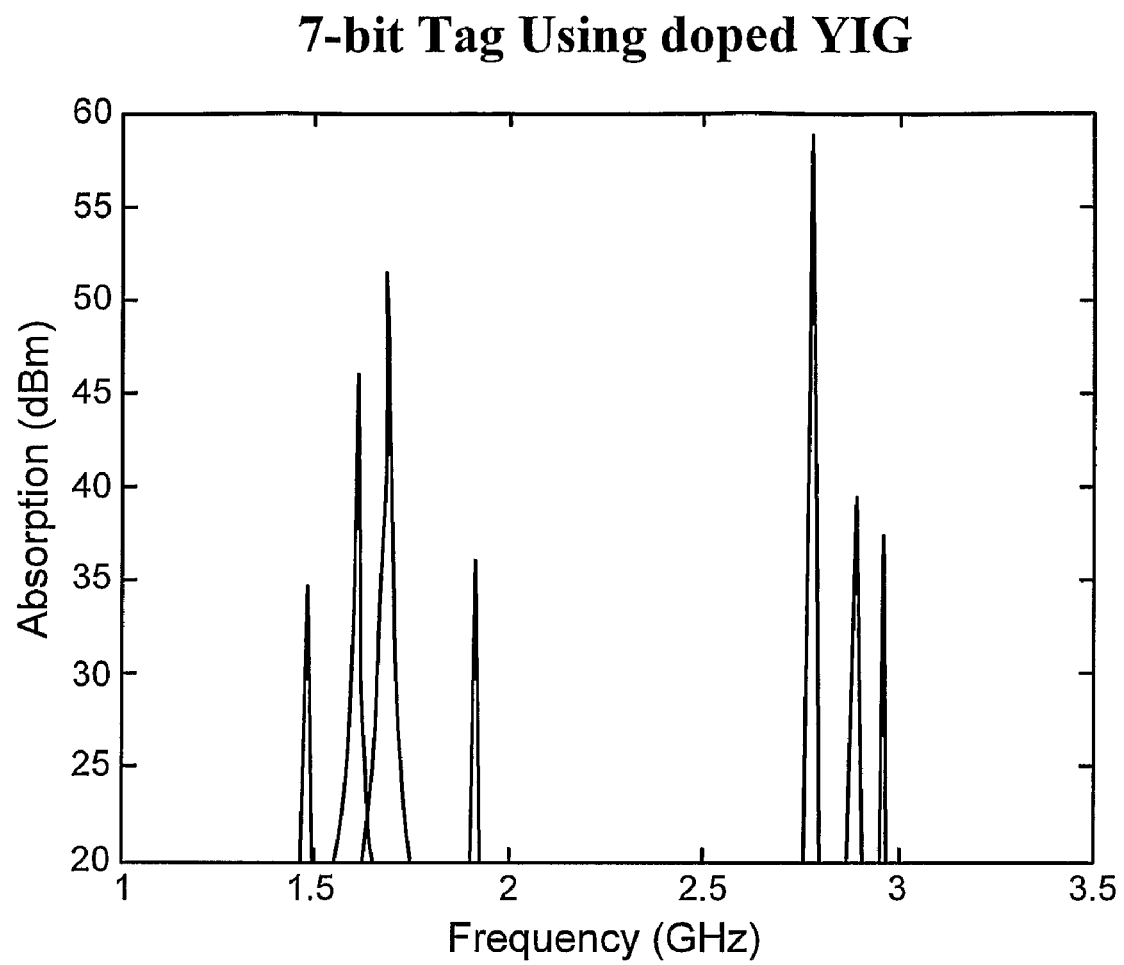
FIG. 11 presents an absorption spectrum for a proposed 7-bit RFID tag made using 7 different YIG materials from the table of FIG. 10.

Ideally, the absorption frequency of each island would be a function of only material and the magnetic field strength (which is identical for each island in a well designed device). However, islands having finite thicknesses (or at least thicknesses that are not very small in comparison to the lengths and widths of the islands) depart from ideality and the sample volume influences the absorption frequency. Note that the calculated absorption frequency (i.e., the expected ideal absorption) and measured absorption frequencies differ to a limited degree. This may be due to relatively thick sample sizes. Importantly, even in this relatively crude test in which sample sizes varied significantly, the absorption frequencies of the various ferromagnetic YIG materials were sufficiently offset from one another to confirm that they could be used in RFID devices of this invention. To this end, a proposed RFID tag comprised of the Al:YIG-225, Al:YIG-570, Al:YIG-1010, Ca:YIG-830, YIG-1775, Al:YIG-1400, and Ca:YIG-1210 samples identified in FIG. 10 would have a spectrum as shown in FIG. 11. The frequency and intensity values as measured for each ferromagnetic YIG material is presented in the spectrum of FIG. 11.

While this invention has been described in terms of a few preferred embodiments, it should not be limited to the specifics presented above. Many variations on the above-described preferred embodiments may be employed. Therefore, the invention should be broadly interpreted with reference to the following claims.

What is claimed is:
1. An RFID tag comprising:
   (a) at least one permanent magnet providing a substantially homogeneous magnetic field to a region of the RFID tag; and
   (b) one or more ferromagnetic patches provided in the region of substantially homogeneous magnetic field; wherein each patch has a defined ferromagnetic resonance frequency and size such that when exposed to microwave or radio frequency stimulation; it emits a signal at the defined resonance frequency at an intensity proportional to the size.
2. The tag of claim 1 wherein the ferromagnetic patches comprise one or more ferromagnetic materials selected from yttrium iron garnet, bismuth iron garnet, bismuth iron oxide, and doped versions thereof.
3. The tag of claim 1 wherein the ferromagnetic patches comprise yttrium iron garnet.
4. The tag of claim 1 wherein the ferromagnetic patches comprise a ferromagnetic material doped with a material selected from Al, Ca, Ga and Si.
5. The tag of claim 1 wherein the RFID tag comprises at least 2 ferromagnetic patches.
6. The tag of claim 1 wherein the tag has an information capacity of at least 96 bits.
7. The tag of claim 1 wherein each patch has a unique resonance frequency and size.
8. The tag of claim 1 wherein the permanent magnet is provided as a layer having a thickness between about 100 nm-100 μm.
9. The tag of claim 1, wherein the permanent magnet is provided with a gap or as two separate magnets separated by said gap, wherein the substantially homogeneous magnetic field is provided in the gap.
10. The tag of claim 1, further comprising a non-conductive and non-magnetic substrate on which at least one of the permanent magnet and one or more ferromagnetic patches are provided.
11. The tag of claim 10, wherein the permanent magnet is provided as at least one permanent magnet layer above the substrate.

12. The tag of claim 10, wherein the permanent magnet substantially surrounds the substrate and includes a gap where the one or more ferromagnetic patches are provided on the substrate.

13. The tag of claim 10, wherein the one or more ferromagnetic patches are provided on a ferromagnetic layer above the substrate.

14. An RFID communication system comprising:
   a) a station having a receiver and a transmitter; and
   b) an RFID tag configured to communicate with the station; the RFID tag comprising:
      (i) at least one permanent magnet providing a substantially homogeneous magnetic field to a region of the RFID tag; and
      (ii) one or more ferromagnetic patches provided in the region of substantially homogeneous magnetic field; wherein each patch has a defined ferromagnetic resonance frequency and size such that when exposed to microwave or radio frequency stimulation; it emits a signal at the defined resonance frequency at an intensity proportional to the size.

15. The RFID communication system of claim 14, further comprising: c) an antenna for receiving an interrogation signal and transmitting an RFID tag signal.

16. The RFID communication system of claim 14, wherein the ferromagnetic patches of the RFID tag comprise one or more ferromagnetic materials selected from yttrium iron garnet, bismuth iron garnet, bismuth iron oxide, and doped versions thereof.

17. The RFID communication system of claim 14, wherein the ferromagnetic patches of the RFID tag comprise one or more ferromagnetic materials doped with a material selected from Al, Ca, Ga and Si.

18. The RFID communication system of claim 14, wherein the RFID tag has an information capacity of at least 96 bits.

19. The RFID communication system of claim 14, wherein the permanent magnet of the RFID tag is provided with a gap or as two separate magnets separated by said gap, wherein the substantially homogeneous magnetic field is provided in the gap.

20. A method of identifying an object comprising:
   a) sending a broadband signal to an RFID tag attached to the object to excite ferromagnetic patches on the tag, the RFID tag comprising one or more permanent magnets providing a substantially homogeneous magnetic field to the patches;
   b) receiving resonance signals associated with the patches; and
   c) determining a frequency spectrum of the tag.

21. The method of claim 20, further comprising sending one or more additional pulses of the broadband signal to the RFID tag after (a).

22. The method of claim 20, wherein the ferromagnetic patches of the RFID tag comprise one or more ferromagnetic materials selected from yttrium iron garnet, bismuth iron garnet, bismuth iron oxide, and doped versions thereof.

23. The method of claim 20, wherein the ferromagnetic patches of the RFID tag comprise one or more ferromagnetic materials doped with a material selected from Al, Ca, Ga and Si.

24. The method of claim 20, wherein the RFID tag has an information capacity of at least 96 bits.

25. The method of claim 20, wherein the permanent magnet of the RFID tag is provided with a gap or as two separate magnets separated by said gap, wherein the substantially homogeneous magnetic field is provided in the gap.

* * * * *